Nov. 24, 1931.  E. A. STULLER  1,833,444
CHAIN WELDING MACHINE
Filed July 20, 1927   2 Sheets-Sheet 1

Earl A. Stuller
Inventor
by Smith and Freeman
Attorneys

Earl A. Stuller
Inventor
by Smith and Freeman
Attorneys

Patented Nov. 24, 1931

1,833,444

UNITED STATES PATENT OFFICE

EARL A. STULLER, OF CLEVELAND, OHIO, ASSIGNOR TO THE CLEVELAND CHAIN AND MANUFACTURING COMPANY, OF CLEVELAND, OHIO, A CORPORATION OF OHIO

CHAIN WELDING MACHINE

Application filed July 20, 1927. Serial No. 207,100.

My invention relates to chain welding machines, and the principal object of my invention is to provide a new and improved machine of this type. In the drawings accompanying this specification and forming a part of this application I have shown, for purposes of illustration, one form which my invention may assume, and in these drawings:

Figure 5 is an enlarged view showing particularly the chain advancing mechanism, while

Figure 1:
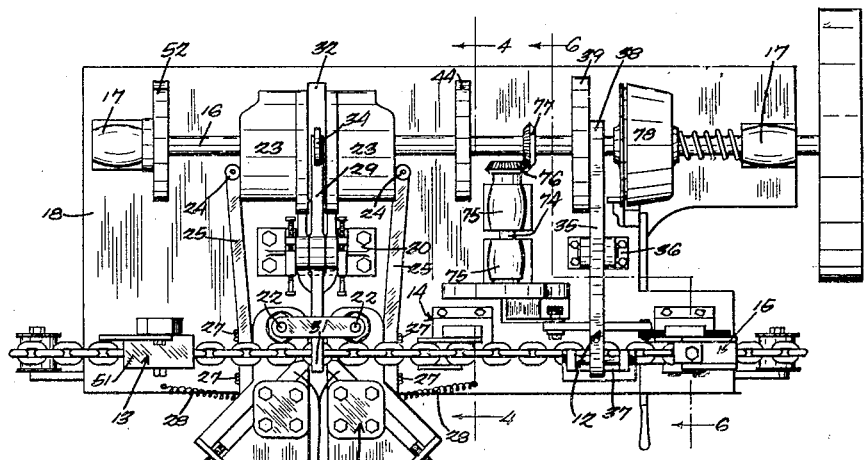
Figure 1 is a top plan view of the embodiment of my invention herein shown.
Figure 2:
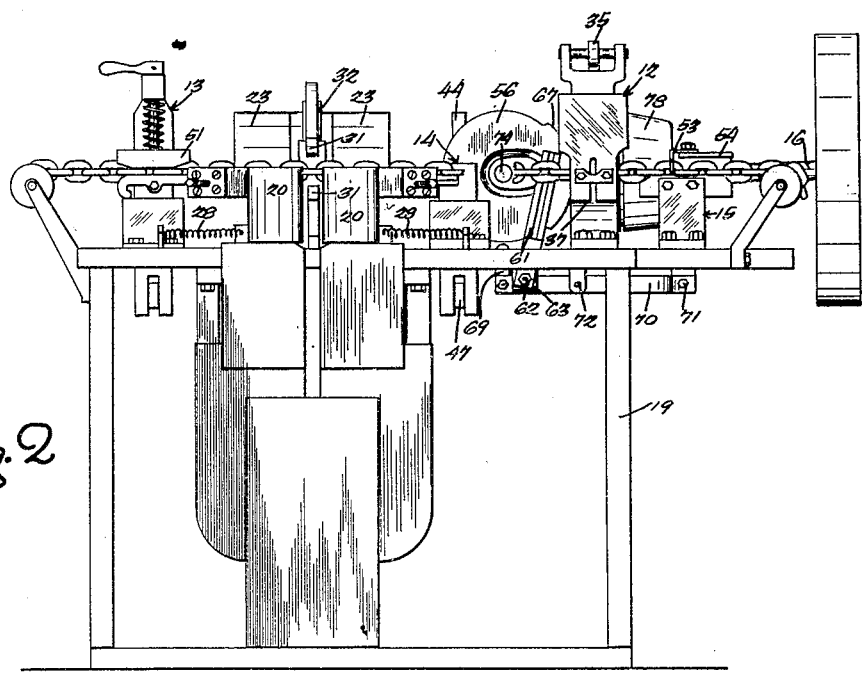
Figure 2 is a front elevation of this embodiment of my invention.

The embodiment of my invention herein shown comprises welding mechanism 11 for welding together the two sides of the opening in each link of the chain, burr removing mechanism 12 for removing the burr formed by the weld, chain lifting mechanisms 13 and 14 for lifting the chain clear of the welding mechanism 11 to permit advance of the chain to present a succeeding link into position to be welded, and advancing mechanism 15 for advancing the chain to present a succeeding link in position to be welded, all operated from a common drive shaft 16 mounted in bearings 17 carried by a table 18 supported by a suitable pedestal 19.

The welding mechanism 11 herein shown comprises a pair of blocks 20 carrying electrodes 21 adapted to be advanced into position engaging the chain link on opposite sides of the cut to weld the link at the cut, or to be retracted from the chain link to permit lifting and advance of the chain; to permit this movement of the electrodes 21 the blocks 20 are pivoted to the table 18 and 22; the oscillation of the blocks 20 and electrodes 21 about the pivots 22 to advance the electrodes 21 into engagement with the link is effected by face cams 23 mounted on the operating shaft 16 and engaging rollers 24 carried by levers 25 secured to the blocks 20 by means of suitable bolts 27; while oscillation of the blocks 20 and electrodes 21 to withdraw the electrodes 21 from the chain link is effected, under control of the cams 23, by springs 28 tensioned between the blocks 20 and the table 18.

The welding mechanism 11 also comprises means for holding secure the link being welded, shown herein as comprising a pair of levers 29 pivoted at 30, provided at their forward ends with jaws 31 for engaging the link, and operated by means of a cam 32 interposed between the two face cams 23 and engaging rollers 34 carried by the rear ends of the levers 29.

The burr removing mechanism 12 is of a well known type, and comprises a lever 35 pivoted to the table 18 at 36, carrying burr removing dies at their forward ends 37, and operated by the action on its rear end 38 of a cam 39 mounted on the operating shaft 16.

The chain raising mechanism 14 comprises a bracket 40 formed to support the chain and itself supported upon a plunger 41 mounted for vertical reciprocation in a guide 42 which is secured to the table 18 by means of bolts 43 and is reciprocated by a cam 44 secured to the operating shaft 16 and actuating the plunger 41 by means of a roller 45 secured to the upper end of a strut 46 rigid with a lever 47 pivoted at its free end at 50 to the lower end of the plunger 41 and pivotally mounted at 48 to a supporting bracket 49 depending from the lower side of the table 18.

The chain lifting mechanism 13 comprises a bracket 51 similarly operated by a cam 52 also carried by the operating shaft 16.

The chain advancing mechanism 15 comprises a finger 53 mounted upon a reciprocating carrier 54 and formed to engage the chain to advance the chain, and reciprocated by reciprocation of the reciprocating carrier 54 effected by a face cam 55 formed in a disc 56 actuating the carrier 54 by means of a link 57 pivoted at one end at 58 to the reciprocating carrier 54 and at the other end at 59 adjustably along a slot 60 to a lever 61 which is pivoted at 62 to a bracket 63 depending from the lower face of the table 18 and is in turn operated by engagement of a projecting pin within the groove of the face cam 55.

It will of course be understood that adjustment of the pivot point 59 along the groove 60 will vary the stroke imparted to the reciprocating carrier 54, and to the finger 53, to thus permit adjustment of the stroke of the finger 53 proper for the length of link being welded.

At the same time it also will be understood that in the absence of further mechanism the finger 53 not only would advance the chain upon advance of the reciprocating carrier 54 but also would correspondingly retract the chain upon retraction of the reciprocating carrier 54, and accordingly that some means must be provided to cause the finger 53 to act upon the chain only upon advance of the reciprocating carrier 54. In the embodiment of my invention herein shown this result is attained by supporting the reciprocating carrier 54 in a block 79 carried by the upper end of a vertically reciprocating plunger 64 which is mounted in a guideway 65 secured to the table 18 by means of bolts 66 and is operated by a rim cam 67 on the disc 56 through a roller 68 engaged by the rim cam 67 and carried by the upper end of a strut 69 projecting from a lever 70 pivoted at its free end at 71 to the lower end of the plunger 64 and pivotally mounted at 72 upon a bracket 73 depending from the lower face of the table 18.

The disc 56 is operated from the operating shaft 16 by means of a jack shaft 74 mounted in suitable bearings 75 secured to the table 18, carrying at one end the disc 56, and carrying at the other end a bevel gear 76 meshing with a like bevel gear 77 mounted on the operating shaft 16.

From the above description it will be obvious to those skilled in the art that for each cycle of the operating shaft 16 the welding mechanism 11 is operated to advance the electrodes 21 against the link to be welded, the welding mechanism 11 is operated to permit retraction of the electrodes 21 from the welded link, the chain lifting mechanisms 13 and 14 are operated to lift the chain free of the welding mechanism 11, the advancing mechanism 15 is operated to advance the chain to present a succeeding link into position to be welded, and the lifting mechanisms 13 and 14 are again operated to lower the chain into position ready for the succeeding link to be acted upon by the welding mechanism 11. It also will be understood that during the action of the welding mechanism 11 the burr removing mechanism 12 is operated to remove the burr from that link which has then been advanced into position between the jaws of the burr removing mechanism.

Figure 3:
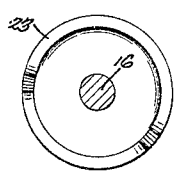
Figure 3 is an end view of one of the welding mechanism operating cams.
Figure 4:
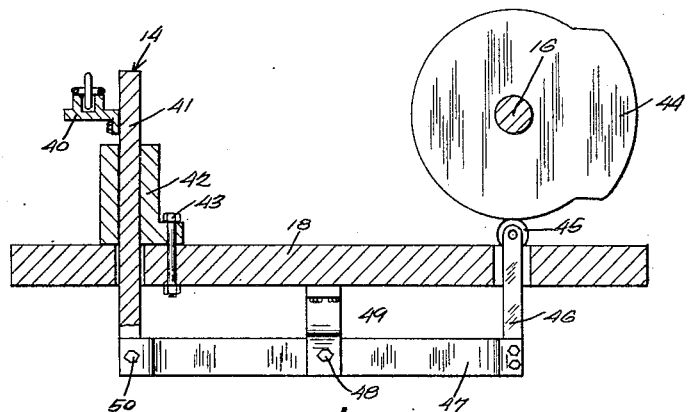
Figure 4 is a section on the line 4—4 of Figure 1 showing particularly one of the chain lifting mechanisms.
Figure 5:
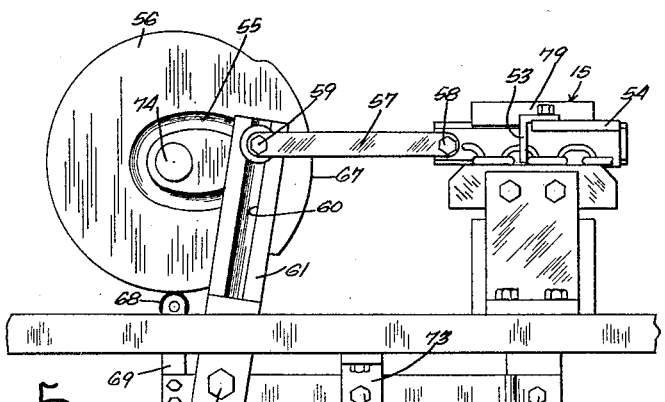
Figure 6:
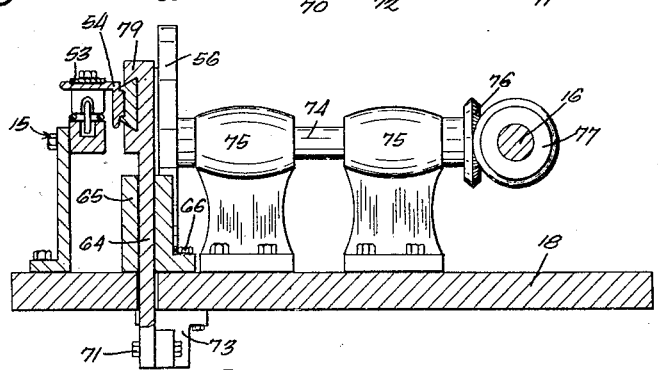
Figure 6 is a section taken on the line 6—6 of Figure 1 also showing particularly the chain advancing mechanism.

It will of course be apparent to those skilled in the art that the time consumed for the welding of each link is composed of the time consumed in actually welding the link plus the time consumed in presenting a new link into position for welding, that with given welding conditions the time consumed in actually welding each link cannot be decreased, and accordingly that the time per link can be decreased only by decreasing the period required for presenting a new link into position for welding. From the above description, and particularly from a consideration of the face cam 23 as shown in Figure 3, it will be apparent to those skilled in the art that the mechanism which I have herein shown and described so greatly reduces the time consumed in advancing a new link into position as for the first time to permit the welding operation to consume more than half the cycle, and accordingly it will be understood by those skilled in the art that the embodiment of my invention herein shown materially reduces the time consumed per link welded.

Under many circumstances the increase in the proportion of the cycle during which the welding mechanism 11 is operative is sufficient to permit the welding machine being operated by continuous rotation of the operating shaft 16, but under other circumstances even this increased proportion is insufficient, and under those conditions I of course actuate the operating shaft 16 through the usual intermittent clutch 78 arranged upon each actuation to rotate the operating shaft 16 from a position in which the welding mechanism 11 is operative through a complete cycle back to the same position in which the welding mechanism 11 is fully operating upon the succeeding link. It of course will be understood that even when it is necessary to employ the intermittent clutch 78 the increase in proportion of the cycle during which the welding mechanism 11 is operative still reduces the total time per link, and accordingly that the advantage of the machine herein shown in reducing the proportion of the cycle necessary to advance the chain is retained under all circumstances either with or without the employment of the intermittent clutch 78. It will be understood however that the particular advantage is that under many conditions this reduction in the time for advancing the chain permits the elimination of the clutch 78, and the automatic operation of the machine.

Under these circumstances it will necessarily be obvious to those skilled in the art that the embodiment of my invention herein shown does provide a new and improved welding machine, and accordingly accomplishes at least the principal object of my invention.

At the same time it also will be understood by those skilled in the art that the embodiment of my invention herein shown and described embodies advantages other than those particularly pointed out or suggested herein, and also that this particular embodiment of my invention may be variously changed and modified without departing from the spirit of my invention or sacrificing the advantages thereof, and it therefore will be understood that the disclosure herein is illustrative only, and that my invention is not limited thereto.

I claim:

1. A chain welding machine comprising: welding means for welding a link of a chain, said welding means requiring a predetermined minimum time for effecting the welding operation; advancing means for removing the welded link and presenting an unwelded link to said welding means; and operating mechanism, including a driving shaft, and having means so proportioned and coordinated as to be operable in two successive fractional phases to effect one complete cycle of welding and advancing movements during one revolution of said shaft, one of said fractional phases comprising operation of said welding means during rotation of said shaft in excess of 180 degrees in the predetermined minimum time for welding, and the other fractional phase comprising operation of said advancing means during the completion of the said one revolution of said shaft and within a period of time less than the minimum time required for the welding operation phase.

2. A chain welding machine comprising: welding means for welding a link of a chain, said welding means requiring a predetermined minimum time for effecting the welding operation; advancing means for lifting, advancing, and lowering said chain, thereby removing the welded link and presenting an unwelded link to said welding means; and operating mechanism, including a driving shaft, and having means so proportioned and coordinated as to be operable in two successive fractional phases to effect one complete cycle of welding and advancing movements during one revolution of said shaft, one of said fractional phases comprising operation of said welding means during rotation of said shaft in excess of 180 degrees in the predetermined minimum time for welding and the other fractional phase comprising operation of said advancing means during the completion of the said one revolution of said shaft and within a period of time less than the minimum time required for the welding operation phase.

In testimony whereof I hereunto affix my signature.

EARL A. STULLER.